United States Patent
Baradon et al.

(10) Patent No.: US 7,122,094 B2
(45) Date of Patent: Oct. 17, 2006

(54) METHOD AND APPARATUS FOR STERILE CONNECTION BETWEEN TWO FLEXIBLE TUBES

(75) Inventors: Jean-Francois Baradon, Lyons (FR); Pierre Francois Leon Mellinger, Eveux (FR); Michel Thoinet, Lyons (FR)

(73) Assignee: Aventis Pasteur, S.A., Lyons (FR)

( * ) Notice: Subject to any disclaimer, the term of this patent is extended or adjusted under 35 U.S.C. 154(b) by 221 days.

(21) Appl. No.: 10/168,363

(22) PCT Filed: Dec. 22, 2000

(86) PCT No.: PCT/FR00/03678

§ 371 (c)(1),
(2), (4) Date: Oct. 15, 2002

(87) PCT Pub. No.: WO01/47692

PCT Pub. Date: Jul. 5, 2001

(65) Prior Publication Data

US 2003/0089446 A1 May 15, 2003

(30) Foreign Application Priority Data

Dec. 24, 1999 (FR) ................................. 99 16802

(51) Int. Cl.
*B29C 65/00* (2006.01)
*B29C 65/02* (2006.01)
*B29C 65/78* (2006.01)
(52) U.S. Cl. ................ 156/304.1; 156/296; 156/304.2; 156/304.9
(58) Field of Classification Search ................ 156/296, 156/304.1, 304.2, 304.6; 138/118, 120
See application file for complete search history.

(56) References Cited

U.S. PATENT DOCUMENTS

| 4,793,880 | A | | 12/1988 | Shaposka |
| 4,864,101 | A | * | 9/1989 | Shaposka et al. ........... 219/243 |
| 4,933,036 | A | * | 6/1990 | Shaposka et al. ........... 156/158 |
| 5,527,406 | A | * | 6/1996 | Brath .......................... 156/64 |

FOREIGN PATENT DOCUMENTS

| AU | 407981 | | 11/1970 |
| CH | 375516 | | 4/1964 |
| DE | 2633141 | * | 1/1978 |

(Continued)

*Primary Examiner*—Justin R. Fischer
(74) *Attorney, Agent, or Firm*—McDonnell Boehnen Hulbert & Berghoff LLP

(57) ABSTRACT

The invention concerns an apparatus wherein each pair of jaws (42) is mounted on a carriage (29, 31) freely mobile on longitudinal slide rails and subjected to the action of springs (28, 32) pushing them towards a retractable stop borne by the frame of the other carriage, while the frame (1) of one of the carriages (29) is itself mounted sliding on transverse slide rails (8) and is coupled to drive means (10) capable of moving it on said rails (8) between an initial position, wherein the pairs of jaws (42, 43) are aligned, and a connecting position, wherein the pairs of jaws are offset and the retractable stops retracted, and the hot blade is borne by a carriage vertically mobile, in both directions, on vertical slide rails (20), said carriage (27) having the shape of a wedge whereof the two lateral sides are profiled and co-operate each, after the retractable stops are retracted and while the blade (27) is being raised, with a roller having a horizontal axis projecting rearward of the corresponding frame or jaw-bearing carriage, to control the travel and the abutting efforts of the tube to be connected.

3 Claims, 5 Drawing Sheets

FOREIGN PATENT DOCUMENTS

Figure 1:
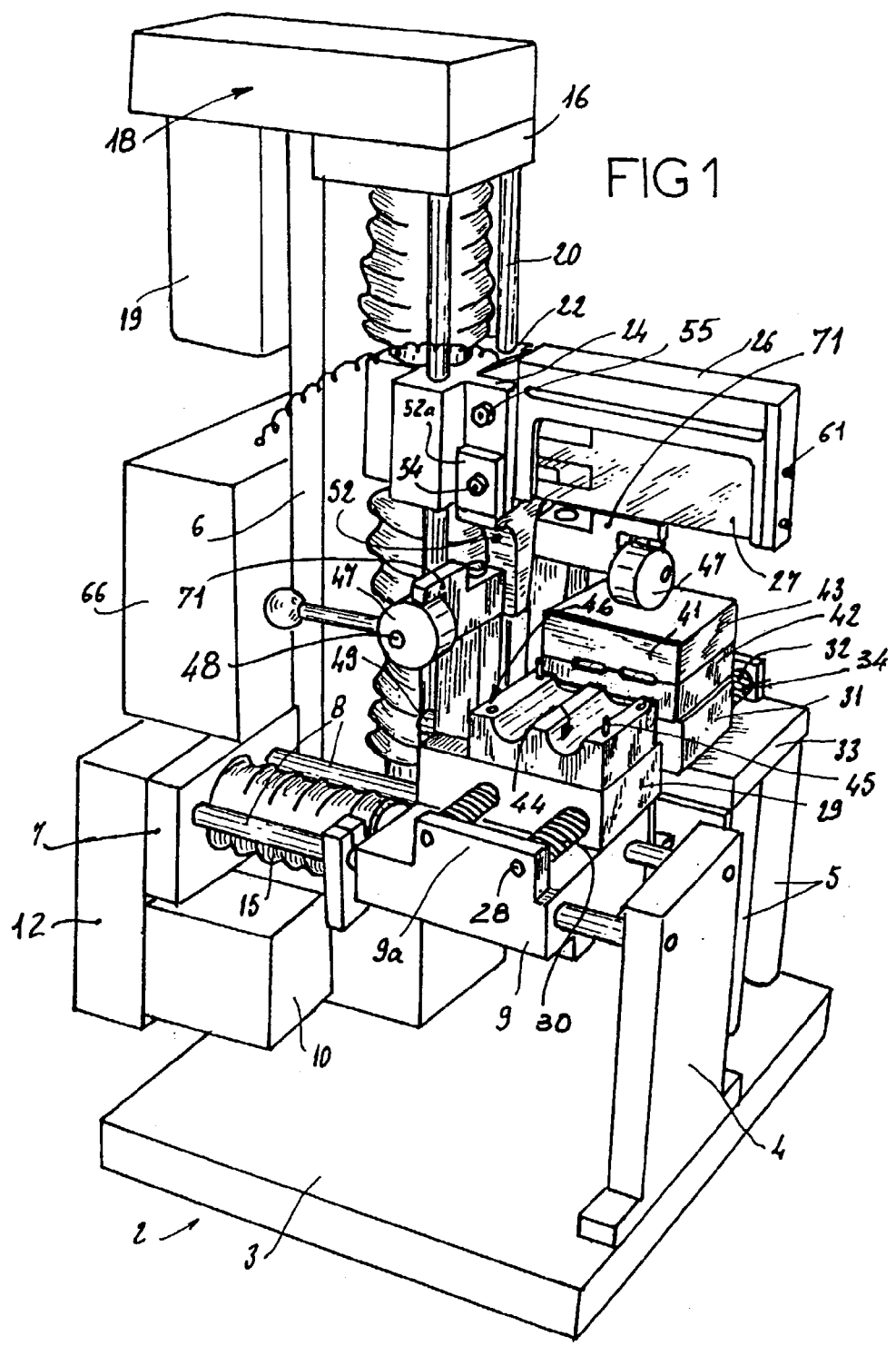

| | | |
|---|---|---|
| EP | 0105587 | 4/1984 |
| EP | 0483478 | 5/1992 |
| EP | 0571978 | 12/1993 |
| EP | 0623450 | 11/1994 |
| FR | 2598653 | 11/1987 |
| JP | 54061271 | * 5/1979 |
| JP | 07329182 | * 12/1995 |
| JP | 10-166448 | * 6/1998 |
| JP | 11178889 | * 7/1999 |
| SU | 1627414 | * 2/1991 |

* cited by examiner

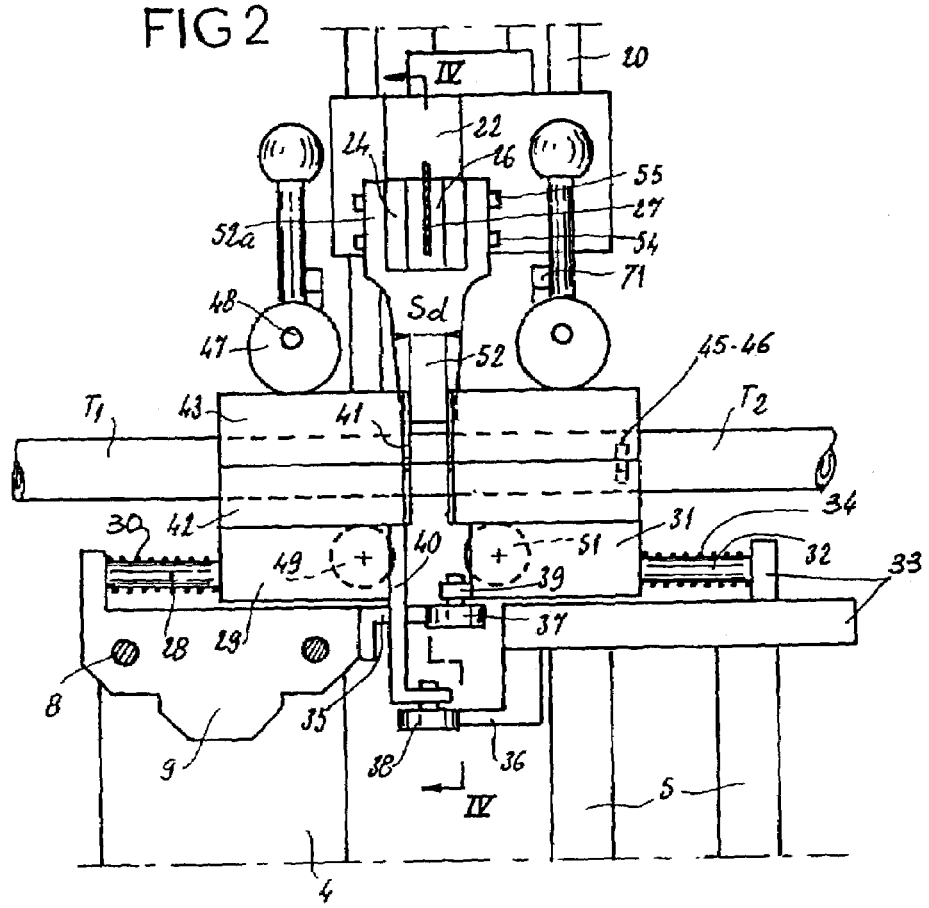
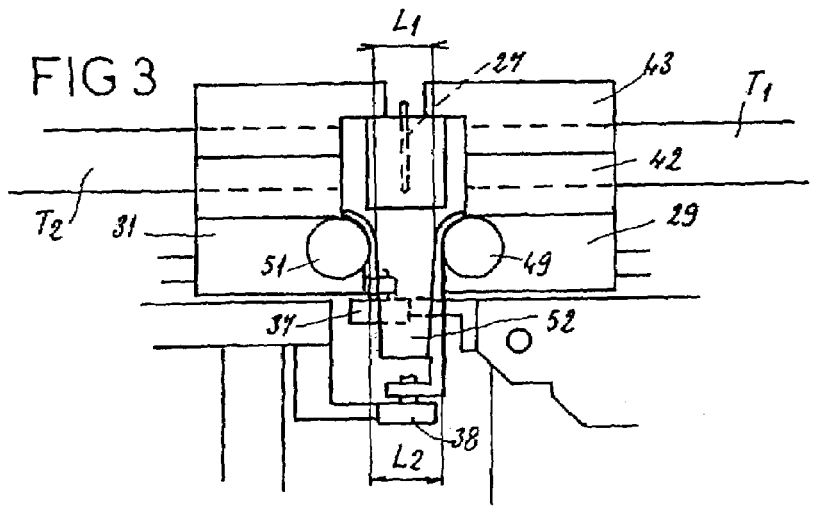

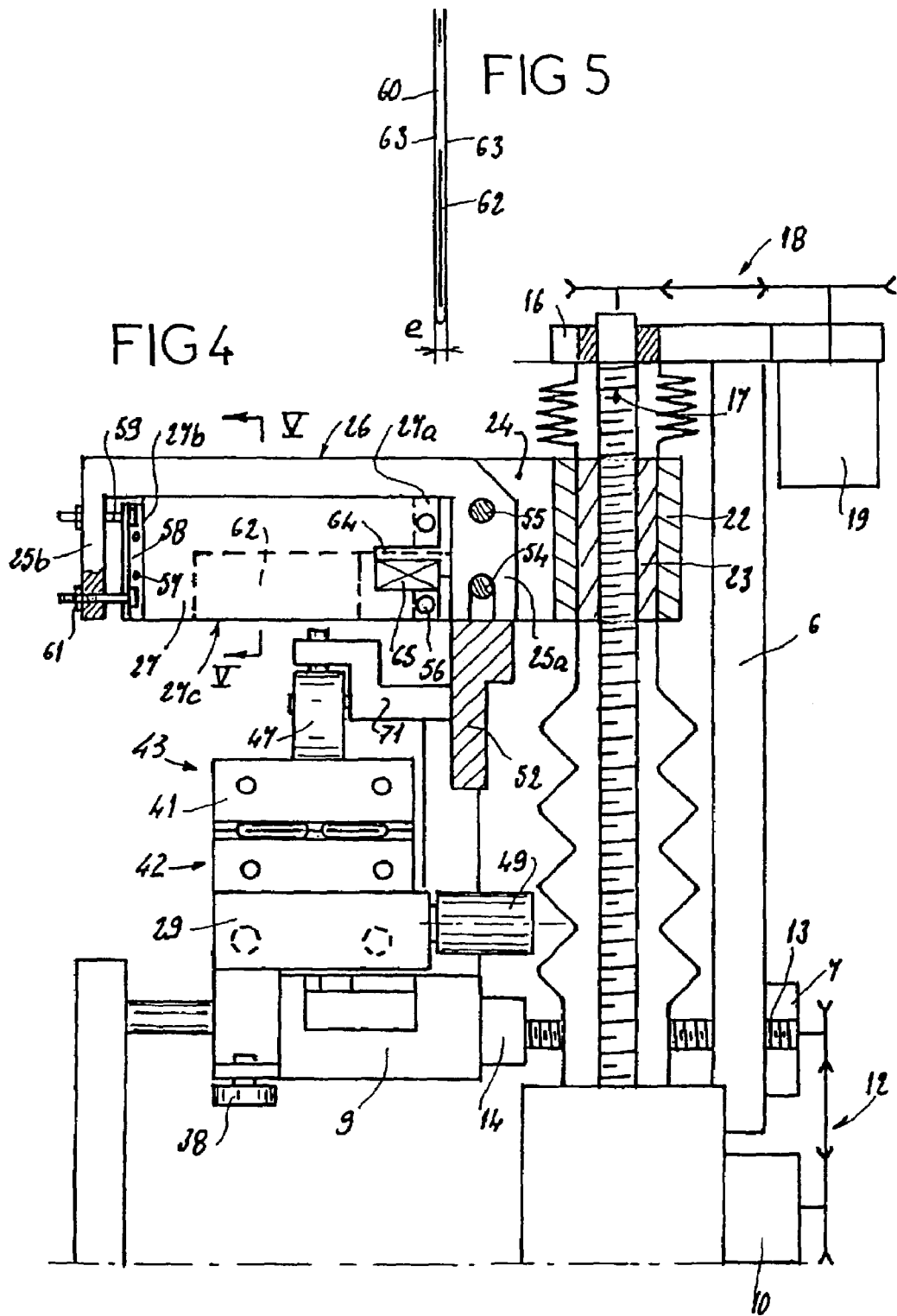

METHOD AND APPARATUS FOR STERILE CONNECTION BETWEEN TWO FLEXIBLE TUBES

The invention relates to a method and to apparatus for the sterile connection of two flexible tubes.

To transfer a fluid contained in a donor container, of any volume, to another container or receiving container, in a non-sterile environment or in an environment which has not to be contaminated by the fluid transferred, it is known practice for the flexible tubes made of thermoplastic and equipping the donor container and receiving container to be butt-connected together. This connection is made by cutting through the tubes that are to be assembled, previously plugged if they were not so already, then by heating their end until their constituent material melts in a localized area, and finally butting the two tubes together by exerting opposing moving-together forces on them so as to weld their ends together.

This connection, which was initially performed by hand by heating the ends of the two tubes over a gas burner, is now carried out by automatic connection apparatus which simplifies the operation by carrying it out under sterile conditions, but which still has a few drawbacks such as the bulk, the formation of beads in the axial bore of the tubes connected, the high cycle time, the emission of fumes and often the fact that the apparatus is limited to tubes made of a defined material and with a small range of diameters.

Document U.S. Pat. No. 4,369,779 describes apparatus in which the two flexible tubes to be connected are positioned, parallel to one another, in two spaced-apart blocks that can be moved in longitudinal translation and are cut through by a heated blade passing between the two blocks. While the blade is between the blocks, one of them is moved in transverse translation to bring the tube it carries into the continuation of the other tube, then, while the blade is withdrawn, one of the two blocks is moved closer to the other by sprung means causing it to pivot to bring the ends of the tubes into contact and then weld them. This device applies only to a tube which is empty or previously emptied of any liquid, and this restricts its application. The butting-together by the pivoting of a block gives a butting-together force which is not perfectly orthogonal to the end face of the tubes, and may lead to irregularities in the connecting weld.

The device described in document U.S. Pat. No. 4,521,263 employs a vertically moving heated blade arranged under the tubes, and holds the tubes, parallel to one another, using two spaced-apart pairs of jaws. One of these pairs of jaws can be moved, transversely and longitudinally, under the control of rotary cams, to carry out the movements of aligning the tubes and of butting their ends together.

Document U.S. Pat. No. 4,610,670 adds to each of the apparatuses described above means for locally flattening each tube in the region between the blocks or jaws. This flattening, which goes as far as to bringing the internal walls of the tube into contact with each other, has the advantage of driving from the cutting and welding zone the fluid contained in one of the tubes and also, after cutting, of avoiding the ingress of bacteria or other contaminants into the two tubes. In addition, as the tubes are brought together for butt welding, this flattening of the two ends of the tubes prevents the molten plastic from running inside the tubes and forming a bead which may reduce the passage cross section in the region of the connection and impede the subsequent flow fluid between the donor container and the receiving container.

Experience has taught that this was an advantage somewhat subject to chance because the lack of formation of a bead depends on numerous factors, particularly on the material of which the tubes are made, on the amount of heat energy supplied to their cut ends, on the cutting conditions and on the butting-together conditions.

The material/heat energy pairing determines the fluidity of the material between the phase of cutting by melt-cutting of the tubes and the phase of removing the blade and therefore the quality of the weld but also the quality of the protection of the interior of the tubes against the surrounding environment, through the contact of the cut and molten ends which wipe against the cutting blade before coming into contact with one another.

For a given material, the characteristics of which are homogeneous through the thickness of the cross section of the cut tube, variations in fluidity may result from differences in the application of heat energy by the heated blade. What happens is that the latter often consists of a resistive electric element and has a tendency to retain residue or traces of materials which stick to it as it cools. Upon heating up again, these residues or traces reduce the heating power of the blade, disturbing the connection operation. Blades of this type have a limited service life and have to be replaced often, even if only to prevent them from coking up and giving off fumes.

The cutting conditions are also important because if the cut is not planar and is not orthogonal to the longitudinal axis of the tube, the sliding of the cut face against the heated blade, in the tube-alignment phase, does not take place correctly and encourages deposits onto the blade. The lack of flatness is also felt during the butting-together, because at that moment, since the two tubes that are coming into contact are doing so not via a surface but via localized protrusions, leakage zones are temporarily formed and allow the pasty material to escape outward or inward, forming, to some extent, a bead on the inside. These flatness defects are generally the result of the deformation of the blade which, under the effect of heating up, expands ununiformly and loses its straightness.

Finally, the butting-together conditions, that is to say the conditions in which the opposed forces which press the two ends of the tubes together are applied, determine the direction of the reaction forces of the material and therefore the direction in which the material will flow, while the intensity determines the amount of material that will flow and therefore the magnitude of the bead or beads.

In the current devices, these various parameters are often poorly controlled and this leads randomly to weld defects, sterility defects, or to the formation of excessive internal beads.

The object of the invention is to provide a method and a device for, under sterile conditions, butt-joining two flexible tubes made of thermoplastic without the formation of an internal bead and to do so over a large range of diameters and with tubes made of various materials.

The method according to the invention is of the kind comprising the following phases:
  cutting through the two tubes by melt-cutting using a
    heated blade moved through the gap between two pairs
    of spaced-apart jaws which position and hold the tubes,
    parallel to one another,
  moving the pairs of jaws relative to one another to align
    the two tubes which are to be connected,
  withdrawing the heated blade,
  and bringing the ends of the tubes closer together to join
    them together by welding.

According to the method of the invention, during the phase of cutting through the tubes by melt-cutting, no moving-together force is exerted on the tubes, and, as soon as the phase of aligning the tubes ends and during the phase of moving these tubes closer together, a controlled longitudinal force is applied to each of these tubes, the value of this force decreasing from the time they rest against the blade until they are viscously butted together.

Thus, the opposing forces for butting together the melted ends of the two tubes have a value which is controlled and which decreases and which encourages the connection by welding without in any way generating significant flows of material and under a pressure which is not high enough to form a troublesome internal bead.

In a preferred embodiment of the method, each of the tubes, at the end of the alignment phase, is subjected to a longitudinal force that presses its end against the heated blade for a timed, limited length of time.

This phase makes it possible to increase the amount of molten material at the end of each of the tubes and to encourage the subsequent welded connecting of these two tubes.

According to a particular embodiment of the invention, the two tubes are flattened before they are cut, and after the ends of the two tubes have been joined by welding, pressure perpendicular to the flattened region is applied to the tube thus obtained to make it return to the initial shape.

The invention also relates to apparatus for the sterile connection of two flexible tubes, comprising:

- two spaced-apart pairs of jaws with means positioning the two tubes that are to be assembled so that they are parallel,
- means for guiding and moving the pairs of jaws in the direction parallel to the tubes,
- means for guiding and moving at least one of the pairs of jaws transversely to the tubes,
- cam and follower means controlling the movements of the pairs of jaws,
- a heated cutting blade that can move vertically in a path which passes through the gap between the two pairs of jaws, to cut through the two tubes,
- and a command and control unit governing the operation of the drive means that generate the movements of the pairs of jaws and of the blade so that, between other phases and after the tubes have been cut by the blade, the transverse movement of the jaws brings the tubes that are to be connected into the continuation of one another.

In the apparatus according to the invention, each pair of jaws is mounted on a carriage which can move freely along longitudinal slide rails of a frame and is subjected to the action of springs working in extension, pushing it toward at least one retractable stop borne by the frame of the other carriage whereas,

- on the one hand, the frame of at least one of the carriages is itself mounted so that it can slide on transverse slide rails borne by the frame of the apparatus and is connected to the drive means able to move it along these slide rails between a starting position, in which the pairs of jaws are aligned, and a connecting position, in which the pairs of jaws are offset and the retractable stops are retracted,
- and, on the other hand, the heated blade is borne by a carriage which can be moved, in both directions and by drive means, along vertical slide rails of the frame of the apparatus, said carriage bearing a vertical wedge-shaped cam the two lateral edges of which are profiled and each collaborate, when the retractable stops have been retracted and while the heated blade is being raised again, with a follower of horizontal axis mounted on the corresponding longitudinal carriage to control the travel and the butting-together forces of the tubes.

With this apparatus, while the heated blade is being lowered, each of the longitudinal carriages bearing a pair of jaws is pressed by sprung means against a retractable stop and subjects the two tubes to no moving-together force. Melt-cutting therefore takes place while the tubes are subjected only to forces which hold them in the jaws.

When the transversely moving carriage reaches its connecting position, corresponding to the two cut tubes being aligned, and when the two retractable stops are retracted, the horizontal followers of the carriages come into contact with the profiled lateral edges of the vertical cam. This movement, of small amplitude, allows the ends of the two tubes to be pressed more firmly against the blade so as to benefit from the heat energy thereof before it is withdrawn.

When the heated blade is raised, its carriage carries with it the vertical cam which, because of its overall wedge shape, gradually releases the two longitudinal carriages, controlling their movement. These carriages, being subjected to the thrust of springs working in extension, each receive a force which decreases and which proves to be good for controlling the flow of the molten material of the two ends of the tubes as these tubes are butted together.

In one embodiment of the invention, each pair of jaws is removable and is made up of a lower jaw and an upper jaw each comprising:

- two longitudinal and spaced-apart channels of open semi-cylindrical cross section,
- complementary positioning means,
- and, against its face facing the other pair of jaws, a vertical plate made of non-stick material partially closing off the opening of the longitudinal channels to form an anvil for flattening the tubes.

This arrangement makes it possible to adapt the pairs of jaws to the size of the tubes which are to take them and thus makes the apparatus universal.

The vertical plates which flatten the tubes before they are melted and cut make it possible not only to drive out the fluid or liquid contained in one of the tubes before the cutting operation but also, through the transverse pressure exerted on the tubes, guarantee that these are closed with a force that is enough to oppose the ingress of a flow of molten plastic into this end.

Advantageously, at least the lower part of the heated blade is subjected, by means inserted between its ends and the corresponding ends of a stirrup-shaped support, to opposed longitudinal forces which keep its active edge straight during the melt-cutting of the tubes.

This arrangement is very important because it makes it possible to produce flat cuts orthogonal to the longitudinal axis of the tubes and therefore guarantees the quality of the butting and of the welded connection of the tubes.

Other features and advantages will become apparent from the description which follows with reference to the appended schematic drawing which, by way of example, depicts one embodiment of the apparatus according to the invention.

Figure 6:
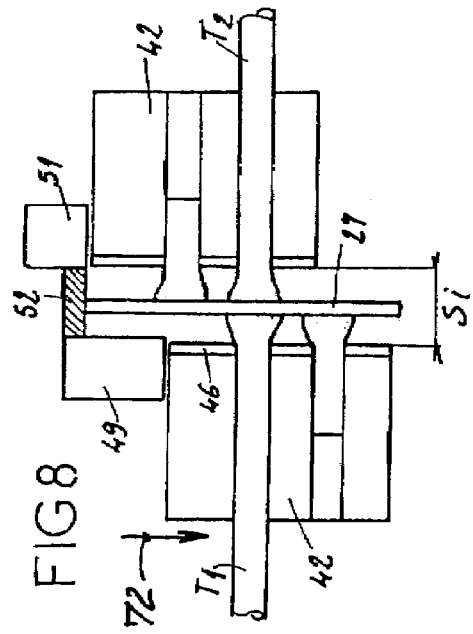
Figure 8:
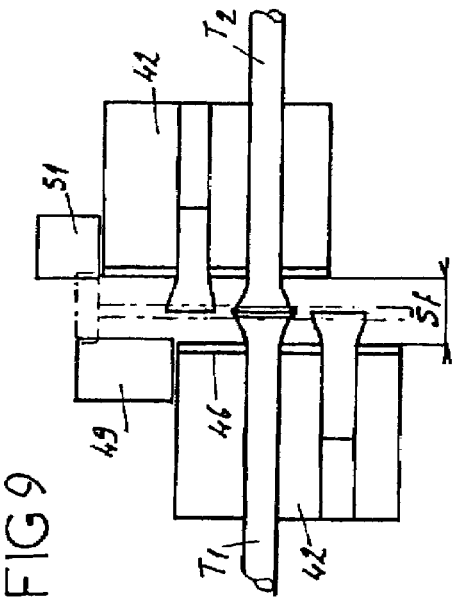
Figure 7:
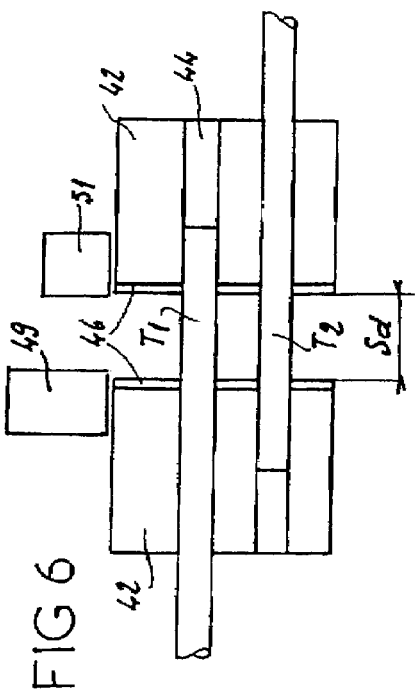
Figure 9:
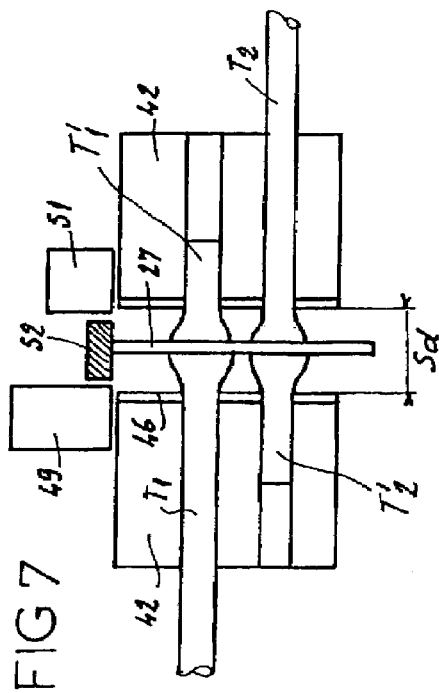
Figure 10:
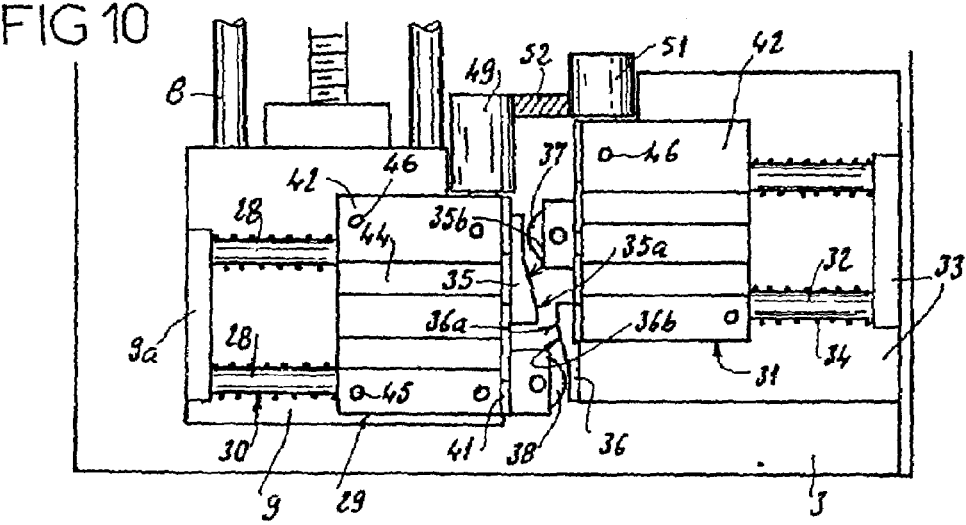
Figure 11:
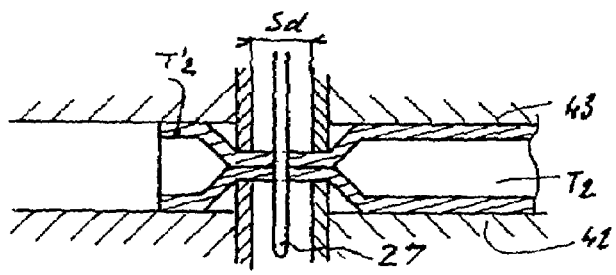
Figure 12:
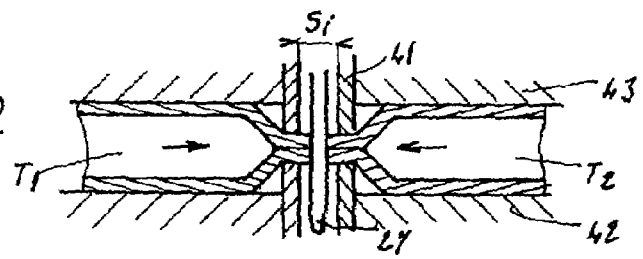
Figure 13:
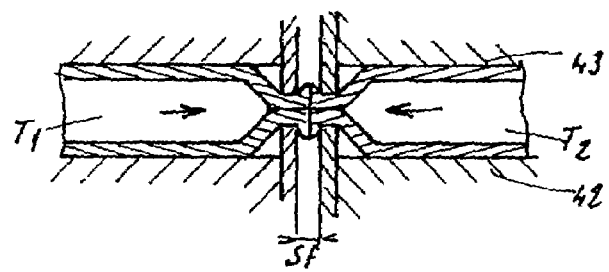
Figure 14:
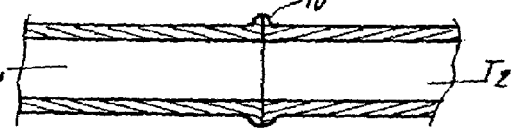

FIG. 1 is a perspective view of the apparatus when it is in the rest position with one jaw withdrawn and one pair of jaws in the clamped position, FIG. 2 is a front-on part view showing the apparatus on an enlarged scale, when it is in the rest position, after the tubes have been fitted into the jaws, FIG. 3 is a part view, from the rear of the apparatus at the end of the lowering of the heated blade and before one pair of jaws is moved transversely, FIG. 4 is a part view in section on IV—IV of FIG. 2, FIG. 5 is a view in section on V—V of FIG. 4 showing, on a larger scale, a section of the heated blade, FIGS. 6 to 9 are plan views, from above, of the lower jaws when they are, respectively:

in FIG. 6 in the position of rest after the tubes have been fitted, in FIG. 7, during the cutting of the tubes using the heated blade, in FIG. 8, after one tube has been moved transversely to align it with the other, and in FIG. 9, while the tubes are being butted together in the hot state, FIG. 10 is a partial plan view from above corresponding to the position of the jaws depicted in FIG. 8 showing the retractable stops in greater detail, FIGS. 11 to 14 are part views, in vertical longitudinal section, showing, on a larger scale, the various phases in the butting-together of two tubes and, more particularly:

in FIG. 11, the jaws and one tube during the melt-cutting phase, in FIG. 12, the jaws and the cut portions, after the carriage has been moved, in FIG. 13, the jaws and the tubes at the end of the hot butting-together phase, and in FIG. 14, the tubes butted together.

According to the depiction of FIG. 1, the numerical reference 2 denotes, in general, the frame of the apparatus made up of a sole 3, of a front upper edge 2, of two lateral upper edges 5 and of a rear column 6. This column is secured to a dorsal plate 7 which, with the front upright 4, supports two horizontal and transverse slide rails 8 on which a carriage 9 is mounted so that it is free in terms of translation. This carriage is connected to means capable of moving it and consisting, for example, of a stepping electric motor 10 which, through a belt and pulley transmission 12 shown in FIG. 4 drives a horizontal and transverse screw 13. This screw, which is mounted so as to be free to rotate in the column 6, collaborates with a ball nut 14 secured to the carriage 9. A gaiter 15, shown in Figure, protects the screw 13.

As shown in FIG. 4, in its upper part, the column 6 supports a bracket 16 in which a vertical screw 17 is mounted so that it is free to rotate, the upper end of which screw, protruding from the bracket, is connected by a belt and pulley transmission 18 to the output shaft of a stepping electric motor 19. The lower end of the screw 17 is supported by a footstep bearing, not depicted. The bracket 16 also supports two vertical slide rails 20, shown in FIG. 1, on which a carriage 22 can slide. FIG. 4 shows that this carriage carries a ball nut 23 which collaborates with the screw 17 to bring about vertical movements thereof.

In the embodiment depicted in FIGS. 1 and 4, the carriage 22 in its anterior part comprises a horizontal yoke 24 in which the posterior upright 25a of a removable support stirrup 26 carrying a heated blade 27 is engaged. These various elements will be described in detail later on.

As shown in FIGS. 2 and 10, the transversely moving carriage 9 supports two horizontal and longitudinal slide rails 28 on which a longitudinally moving carriage 29 can slide. Sprung means, such as helical springs 30, operating in extension, are arranged around the slide rails 28 and are inserted between, respectively, the side wall 9a of the carriage 9 and the lateral face of the carriage 29 so as to constantly push this carriage 29 toward the heated blades 27 and, more precisely, toward the other longitudinally moving carriage 31 arranged facing it. This carriage 31 is mounted so that it is free in terms of translation on longitudinal slide rails 32 borne by a chassis 33 supported by the lateral uprights 5. Helical springs 34 are arranged around the slide rails 32 to push the carriage 31 toward the carriage 29 facing it.

At rest, the movement of each of the carriages 29, 31 toward the other is limited by retractable stops. As shown in greater detail in FIG. 10, each stop is made up of a horizontal blade—35, secured to the carriage 9 constituting the frame for the carriage 29, and 36, borne by the carriage 33—and, on the other hand, of a follower of horizontal axis—37 for the carriage 31, and 38 for the carriage 29.

The followers 37 and 38 respectively are mounted so that they are free to rotate at the ends of supports 39 and 40 respectively which are visible in FIG. 2 and connected to the corresponding carriages 31 and 29.

FIG. 2 shows that the blades 35 and 36 and their respective followers 37 and 38 are offset vertically in space, while FIG. 10 shows that the same assemblies are offset in the horizontal plane. Each stop blade 35, 36 has a flat and transversal bearing face 35a and 36a respectively, juxtaposed with a retraction ramp 35b and 36b respectively. These ramps are oriented in such a way as to allow the carriages 29 and 31 to move closer together as the carriage 9 moves transversely, that is to say as the carriage 9 moves from its position of rest in which the longitudinal carriage 29 it bears is in the continuation of the carriage 31, into its connecting position in which the carriage 29 is offset from the carriage 31 so as to align the tubes.

It should be noted that, in the example illustrated, only the longitudinal carriage 29 is mounted so that it can move transversely with respect to the longitudinal carriage 31. Of course, it may be anticipated for the longitudinal carriage 31 also to be mounted so that it can move transversely, so as to allow the tubes to be aligned.

As shown in FIGS. 1 and 2, each of the carriages 29, 31 bears a pair of identical jaws, namely a lower jaw 42 and an upper jaw 43. Each of these jaws has, passing longitudinally through it, two longitudinal and parallel channels 44 of semi-cylindrical cross section and each of which is open at each of its two ends. The channels are arranged parallel and spaced apart by the same amount in the various jaws. The relative positioning of the jaws in each pair and with respect to the corresponding carriage 29 or 31 is performed by vertical fingers 45 (FIGS. 1 and 10) collaborating with bores 46 formed facing each other. This arrangement makes it easier for the jaws to be removable and above all allows them to be replaced with jaws which have channels suited to the tubes T1 and T2 which are to be connected.

Each of the jaws and each pair of jaws 42, 43 comprises, fixed against its face that faces the other pair of jaws, a vertical plate 41 made of non-stick material partially closing up the opening of the longitudinal channels 44 to form an anvil for flattening the tubes T1, T2.

As shown in greater detail in FIG. 10, each of the longitudinally moving carriages 29 and 31 bears, for example protruding from its posterior face, a follower of horizontal axis 49 and 51 respectively. These two followers are intended to collaborate with the profiled edges of a wedge-shaped cam 52 borne by the vertically movable carriage 22. This cam 52, which hangs down below the carriage 22, is fixed, as shown in FIGS. 1 and 2, via its yoke-shaped end 52a, which sits over the yoke 24 carrying the blade stirrup 26. Fixing is via a through-bolt 54 (FIGS.

1 and 2) arranged under the bolt 55 that secures the stirrup to the yoke. This method of attachment allows the cam 52 to be replaced so as to tailor its profiled edges to the butting-together conditions.

The clamping of each pair of jaws 42, 43 and of the plates 41 associated with them is performed, in the embodiment depicted in FIGS. 1 and 2, by an eccentric 47 arranged above it and mounted so that it is free to rotate about a spindle 48 borne by the frame 2. FIG. 1 shows that the spindle 48 is horizontal and protrudes from an arm 71 which is articulated about a vertical spindle borne by the frame 2, so that it can be retracted and to make it easier to remove the jaws.

In a preferred embodiment depicted in FIGS. 4 and 5, the heated blade 27 is fixed by its posterior vertical edge 27a to the posterior upright 25a of the stirrup 26, for example by transverse screws or rivets 56, while its anterior edge 27b is secured by screws or rivets 57 to a strip 58, for example of L-shaped cross section. This strip is connected to the anterior upright 25b of the stirrup by at least two horizontal threaded connecting members and, for example, by two screws 59. The head of each screw rests against the bent flange of the strip 58, while its shank passes through this strip and the upright 25b to take a nut 61 screwed onto it. When the nuts are tightened, the screws 59 are tensioned and impart to the blade 27 a longitudinal tension which opposes the retaining force afforded by the fixing of its other end. These opposed forces keep the heated blade in tension and guarantee, when it is raised to the cutting temperature of the order of 220° C., that its active edge 27c maintains its straightness and is not subjected to deformations resulting from its longitudinal expansion.

Furthermore, and as shown in FIG. 5, this heated blade advantageously consists of the bending into a U-shape of a metal tape with a thickness of the order of 0.2 millimeters. This being the case, the web of the U forms the active edge 27c of the heated blade and the gap 60, between the two flanges thus obtained, acts as a housing for a means 62, such as an electric heater, also of the order of 0.2 millimeters thick. The assembly thus formed forms a blade, the thickness e of which is, at maximum, of the order of 1 millimeter. The exterior faces of the heated blade 27 are covered with a non-stick coating 63.

Finally, as shown in FIG. 4, in its posterior part, the blade 27 has, passing right through it, a slot 64 which acts as a housing for means 64 for regulating the temperature of the blade.

The various electrical means 62, 65 and the electric motors 10 and 19 which govern the respective movements of the transverse carriage 9 and of the vertical carriage 22 are connected, by electric circuits which have not been depicted, to a command and control unit 66.

The way in which the apparatus according to the invention works stems directly from the foregoing description.

When the apparatus is in the rest position, the carriage 22 is in the raised position with the heated blade 27 and the wedge-shaped cam 52, the transverse carriage 9 is in the rear rest position, the two longitudinal carriages 29 and 31 are in abutment against their retractable stops leaving between them a gap Sd which, visible in FIG. 2, is of the order of 5 millimeters, and is equally distributed about the vertical mid-plane of the heated blades 27.

To connect the two thermoplastic tubes T1, T2, the upper jaws 43 are removed and the two tubes are placed top to toe in the aligned channels 44 of the lower jaws 42 as shown in FIG. 6. Once the upper jaws 43 have been fitted, the clamping eccentrics 47 are actuated to clamp the pairs of jaws and, via the plates 46, flatten the tubes which adopt the shape depicted in FIG. 7.

At this stage, the automatic operating cycle of the machine may be started. This cycle begins with the lowering of the heated blade 27 until it comes into contact with the tubes T1 and T2 to cut them by melt-cutting as shown in FIG. 11 where T'1 and T'2 denote the offcuts.

It is emphasized that, by virtue of the short overhanging distance of the tubes in the gap between the pairs of jaws, and also as a result of the absence of any moving-together force tending to press these tubes against the faces of the heated blade 27, melt-cutting is performed under excellent conditions without any deformation of the tubes. By virtue of that, the tubes have an end face which is flat and orthogonal to their longitudinal axis, making them easier to butt together later.

While the heated blade 27 is being lowered, the vertical cam 52 inserts itself between the followers 49 and 51 of the carriages 29 and 31 respectively, without coming into contact with these followers because, as shown in FIG. 3 which corresponds to the position of the cam at the lower end of its travel, the width L1 of the cam, measured in the horizontal mid-plane passing through the axis of the followers 49, 51, is smaller than the distance L2 between these followers. FIG. 7 also shows that, at the end of the lowering of the blade, the gap Sd between the pairs of jaws has the same size as it did at the start of the operation.

In the next phase, shown in FIG. 8, the transverse carriage 9 is moved transversely, in the direction of the arrow 72, from its rest position to its connecting position so as to bring the pipe T1 into the continuation of the pipe T2. During this movement, the stop blade 35 moves with respect to the follower 37, while the follower 38 runs along the stop blade 36. The result of this is that the points of contact limiting the movement of the carriages 29 and 31 move from the flat faces 35a, 36a onto the ramps 35b and 36b, allowing the carriages 29 and 31 to be moved closer together and therefore allowing relative movement between the pairs of jaws they bear with a view to aligning the two tubes T1, T2. However, this movement is limited because, as shown in FIGS. 8 and 10, the horizontal followers 49 and 51 come into contact with the profiled lateral edges of the cam 52 and limit its movements.

It is evident that, during the transverse movement of the carriage 9, the end faces of the tubes T1, T2, obtained by melt-cutting and in the viscous state, are pressed gradually against the lateral faces of the heated blade 27, which limits the friction on this blade. At the end of this movement, the end faces of the tubes T1, T2 are in the position depicted in FIG. 12 where the dimension Si shows the variation in the gap between the jaws.

According to the invention, the force with which the tubes are applied to the heated blade 27 is maintained for a timed length of time so as to increase the amount of heat energy transmitted by the blade 27 to the ends of the tubes, and so as to increase the amount of viscous material before the heated blade is raised. As soon as the latter is raised, the simultaneous movement of the cam 52 causes, through the followers 49 and 51 rolling along its longitudinal edges, the controlled moving-together of the two pairs of jaws 42, 43. In addition to the control over the movement of the end of each tube, the springs 30 and 34 which supply the movement lengthen and develop opposed forces which decrease.

The combination of the control of the butting-together forces, of the decrease in this force and of the flatness of the surfaces facing each other allow the viscous material of the two ends of the tubes T1, T2 which first of all come to face each other and then come into contact as the heated blade gradually moves, to fuse under excellent conditions without having a tendency to flow into the tubes and without forming preferential flows which may affect the sterility of the connection conditions.

The vertical cam 52 has a length which allows it to control the moving-together of the tubes, even after the heated blade 27 has left the connecting region and up until the time that the stop blades 35 and 36 take over in collaboration with the respective followers 37 and 38. Thus, the control of the butting-together forces is had for a jaw separation ranging from the value Si depicted in FIGS. 8 and 12 to the value Sf depicted in FIGS. 9 and 13. It is emphasized that in FIGS. 6 to 9 and 11 to 13, the values of the dimensions Sd, Si and Sf have been deliberately exaggerated since, in practice, the variation of the values is of the order of 1.5 to 2 millimeters.

At the end of the cycle, the total duration of which is of the order of one minute, that is to say several times shorter than the cycle time of the apparatus currently on the market, the two connected tubes are left to cool for a time of the order of one minute, then the jaws 43 are removed and the tube formed by connecting the connected tubes T1–T2 is extracted.

The cycle ends with the return of the transverse carriage 9 to the rest position, this return involving the parting of the pairs of jaws to their initial value Sd through contact of the followers 37, 38 with stop blades 35, 36.

The tube thus obtained is pressed at right angles to its flattened region to make it return to its initial shape, as shown in FIG. 14. Its joining region is embodied by a single external bead 70 since, because the tubes were flattened and because the butting-together forces were controlled, no viscous material was able to enter inside this joining region.

Tests have shown that, by changing the jaws, the apparatus according to the invention could connect tubes with an outside diameter ranging from ⅜ inch, namely 9.5 millimeters to ¾ inch, namely 19 millimeters, the inside diameters ranging from ¼ inch, namely 6.4 millimeters to ½ inch, namely 12.7 millimeters, whether the materials of the tubes that were to be connected were identical or different, provided they were compatible so that they could be connected by welding. In this range of values, the connections obtained are sterile, can withstand for one minute a tensile force ranging, respectively, from 8 to 23 decanewtons, and are airtight to a compressed air pressure of 2 bar.

Furthermore, the melt-cutting conditions afforded by the rigidity of the tube holding means, by the straightness of the heated blade, in the heated state, and by its non-stick nature, combined with the control of the butting-together forces, eliminate any deposition and any evolution of fumes and guarantee that the contents of the tubes do not communicate with the surrounding environment.

The method and apparatus according to the invention can be used for connecting, in a sterile manner, in a sterile or contaminated environment, any flexible tube made of thermoplastic, for example:
  for welding the tube of a container of dialysis solution to a tube from the peritoneal cavity of a patient,
  for assembling flexible bloodbag tubes,
  and, in general, for any flexible tube associated with a container containing a liquid or fluid, biological or otherwise, with a tube allowing the content of the container to be led to patient treatment apparatus, analysis apparatus or to a receptacle of a treatment, manufacturing or some other plant.

The invention claimed is:

1. A method for butt-joining two flexible tubes made of thermoplastic, with closed or unclosed ends, comprising the following steps:
  cutting through two tubes by melt-cutting using a heated blade moved through a gap between two pairs of spaced-apart jaws that position and hold the tubes parallel to one another,
  moving the pairs of jaws relative to one another and aligning two tube ends that are to be connected,
  withdrawing the heated blade,
  moving the ends of the tubes closer together, and
  joining the ends of the tubes together by welding, thereby viscously buffing the tube ends together,
whereby:
  during the step of cutting through the tubes by melt-cutting, no moving-together force is exerted on the tubes,
  and, as soon as the step of aligning the tube ends is completed and during the step of moving the tube ends closer together, a controlled longitudinal force is applied to each of the tubes, the value of this force decreasing from the time the tube ends rest against the blade until the tube ends are viscously buffed together.

2. The method as claimed in claim 1, wherein each of the tubes, at the end of the aligning step, is subjected to a longitudinal force that presses its end against the heated blade for a timed, limited length of time.

3. The method as claimed in claim 1, further comprising the following steps:
  flattening the two tubes before they are cut, thereby creating a flattened region on each tube;
  and, after the ends of the two tubes have been joined by welding, applying pressure perpendicular to the flattened region of each tube to return each tube to its initial shape.

* * * * *

UNITED STATES PATENT AND TRADEMARK OFFICE
CERTIFICATE OF CORRECTION

| | | |
|---|---|---|
| PATENT NO. | : 7,122,094 B2 | Page 1 of 1 |
| APPLICATION NO. | : 10/168363 | |
| DATED | : October 17, 2006 | |
| INVENTOR(S) | : Jean-Francois Baradon, Pierre Francois Leon Mellinger and Michel Thoinet | |

It is certified that error appears in the above-identified patent and that said Letters Patent is hereby corrected as shown below:

Column 10, line 28, delete "buffing" and insert therefore -- butting --

Column 10, line 38, delete "buffed" and insert therefore -- butted --

Signed and Sealed this

Ninth Day of January, 2007

JON W. DUDAS
*Director of the United States Patent and Trademark Office*